(12) United States Patent
Otten

(10) Patent No.: US 11,534,941 B2
(45) Date of Patent: Dec. 27, 2022

(54) METHOD AND DEVICE FOR COMMINUTING A PLASTIC AND FOR PRODUCING POWDERED MATERIAL FROM SAID PLASTIC

(71) Applicant: DRESSLER GROUP GMBH & CO. KG, Meckenheim (DE)

(72) Inventor: Dittmar Otten, Alfter (DE)

(73) Assignee: DRESSLER GROUP GMBH & CO. KG, Meckenheim (DE)

( * ) Notice: Subject to any disclaimer, the term of this patent is extended or adjusted under 35 U.S.C. 154(b) by 0 days.

(21) Appl. No.: 17/265,679

(22) PCT Filed: Jul. 16, 2019

(86) PCT No.: PCT/EP2019/069103
§ 371 (c)(1),
(2) Date: Feb. 3, 2021

(87) PCT Pub. No.: WO2020/025312
PCT Pub. Date: Feb. 6, 2020

(65) Prior Publication Data
US 2021/0299912 A1  Sep. 30, 2021

(30) Foreign Application Priority Data
Aug. 3, 2018 (DE) ...................... 10 2018 118 913.3

(51) Int. Cl.
*B29B 9/16* (2006.01)
*B29B 9/02* (2006.01)
(Continued)

(52) U.S. Cl.
CPC .................. *B29B 9/16* (2013.01); *B29B 9/02* (2013.01); *B29B 9/12* (2013.01); *B29B 13/10* (2013.01);
(Continued)

(58) Field of Classification Search
CPC .... B29B 9/02; B29B 13/10; B01J 2/30; B01J 2/04; B01J 2/003; B01J 2/006
See application file for complete search history.

(56) References Cited

U.S. PATENT DOCUMENTS 5,006,368 A * 4/1991 Louks ...................... C08J 3/203
427/189
5,938,994 A * 8/1999 English ................... B29B 7/726
264/102
(Continued)

FOREIGN PATENT DOCUMENTS

| CN | 1502643 A | 6/2004 |
| CN | 103648630 A | 3/2014 |

(Continued)

OTHER PUBLICATIONS

International Search Report dated Oct. 16, 2019 re: Application No. PCT/EP2019/069103, pp. 1-3, citing: EP 1754725 A2, DE 102011080233 A1, DE 202016106243 U1, WO 2018113955 A1, US 2011223413 A1, U.S. Pat. No. 6,171,433 B1 amd DE 4319990 A1.

(Continued)

*Primary Examiner* — Mary Lynn F Theisen
(74) *Attorney, Agent, or Firm* — Cantor Colburn LLP

(57) ABSTRACT

A method and device for comminuting a thermoplastic polymer, in particular a thermoplastic elastomer, and for producing therefrom pulverulent materials with a predefined grain distribution, includes the following steps: comminuting the thermoplastic polymer, which is provided in lump form, into a starting powder in a comminuting device, and subsequently screening this starting powder at least once until a predefined grain distribution has been attained. A release agent, which reduces the tack and capability for (Continued)

agglomeration formation of the starting powder, is fed into the comminuting device during the comminuting step.

14 Claims, 2 Drawing Sheets

(51) Int. Cl.
    *B29B 13/10* (2006.01)
    *B29B 9/12* (2006.01)
    *B29K 101/12* (2006.01)

(52) U.S. Cl.
    CPC ..... *B29B 2009/163* (2013.01); *B29K 2101/12* (2013.01)

(56) References Cited

U.S. PATENT DOCUMENTS

| | | | |
|---|---|---|---|
| 6,171,433 B1 | 1/2001 | Otaigbe et al. | |
| 6,428,733 B1* | 8/2002 | Zwart | B29B 9/16 241/15 |
| 2004/0112996 A1 | 6/2004 | Villwock et al. | |
| 2007/0041796 A1* | 2/2007 | Irie | C08F 220/06 407/30 |
| 2011/0223413 A1 | 9/2011 | Herfert et al. | |
| 2012/0053278 A1* | 3/2012 | Malucelli | B29B 9/065 524/400 |
| 2014/0167299 A1* | 6/2014 | Herbert | B01J 2/30 264/13 |
| 2015/0353654 A1* | 12/2015 | Polastri | B29B 9/08 427/180 |
| 2018/0251608 A1* | 9/2018 | Jurkovic | C08J 3/128 |

FOREIGN PATENT DOCUMENTS

| | | |
|---|---|---|
| CN | 106221109 A | 12/2016 |
| DE | 4319990 A1 | 12/1994 |
| DE | 102011080233 A1 | 2/2013 |
| DE | 202016106243 U1 | 11/2016 |
| EP | 1754725 A2 | 2/2007 |
| EP | 2957598 A1 | 12/2015 |
| GB | 1362870 A | 8/1974 |
| JP | 2017087491 A | 5/2017 |
| WO | 2007008480 A1 | 1/2007 |
| WO | 2018113955 A1 | 6/2018 |
| WO | 2018134087 A1 | 7/2018 |

OTHER PUBLICATIONS

CN Office Action dated Mar. 1, 2022 re: Application No. 201980051296.0, pp. 1-20, citing: US2004112996A1, CN1502643A, GB1362870A, CN106221109A and CN103648630A.

KR Office Action dated Jan. 14, 2022 re: Application No. 10-2021-7002482, pp. 1-13, citing: EP 1754725 A2, JP 2017-087491 A and DE 202016106243 U1.

* cited by examiner

METHOD AND DEVICE FOR COMMINUTING A PLASTIC AND FOR PRODUCING POWDERED MATERIAL FROM SAID PLASTIC

TECHNICAL FIELD

The disclosure relates to a method and a device for comminuting thermoplastic polymers and for producing therefrom pulverulent materials with a predefined grain distribution.

The aim is grain sizes of less than 500, in particular less than 100 µm, e.g. particles in the range of 30 to 100 µm. The maximum upper limit that can be specified is 800 µm. The lower limit lies in the range of a few nanometers, preferably at about 1 or 10 µm. If possible, the deviation from the spherical shape is supposed to be such that the smallest cross-sectional dimension of a particle is not smaller than 20, preferably not smaller than 50% of the largest cross-sectional dimension of these particles.

Such a pulverulent material is required for many areas of use, e.g. for 3D printing, powder coating etc. The more spherical the individual particles are, the more flowable the powder is. Powder of this kind is required by the market in grain distributions that are desired in each case and predefined for the individual intended uses. In order to produce a specific powder, a starting material provided in lump form and as a thermoplastic polymer is first comminuted in a comminuting step into a starting powder; in a screening process, the starting powder is then screened in such a way that the desired grain distribution, which is also referred to as powder distribution or grain band, is attained. This final powder is then packaged and shipped.

BACKGROUND

A device for manufacturing such pulverulent materials is known from DE 20 2016 106 243 U1. Here, a hot melt of the plastic starting product is supplied to a nozzle device from which the melt exits and separates into small droplets that fall down.

They are cooled down by means of cryogas and collected in a lower area. This is followed by screening and packaging.

Furthermore, it is known to first dissolve the plastic starting product in a solvent and to obtain the particles therefrom; e.g. to atomize or spray the obtained solution and to keep the obtained droplets in isolation until the solvent has substantially evaporated. In this method, it is not necessary to bring the plastic to a higher temperature, so that chemical changes are not to be expected in this respect. However, the solvent acts on the plastic.

Devices and methods for grinding and producing powders are in use in the industry. WO 2007/008480 A1 describes a method for grinding at cryo-temperatures and producing a powder; the known prior art of cryo-grinding is described in detail on several pages in the introduction to the description. EP 2 957 598 A1 discloses a method for producing polyamides converted into powder by cryogenic grinding. A screening process then takes place.

A cryogenic temperature is generally understood to be a temperature below minus 150° C. For the application at hand, temperatures below −50° C. are to be included, which also includes cooling using dry ice $CO_2$.

It is also possible not to carry out the comminuting step at low temperatures. Grinding at low temperatures is generally necessary if the glass transition temperature of the polymer is below −20, particularly below 30° C., because otherwise, the respective polymer cannot be comminuted normally.

The above-mentioned methods are examples for comminuting plastic starting material into pulverulent plastic. Further comminuting methods are known from the prior art.

When comminuting, the pulverulent final product as demanded and desired by the market is generally not obtained immediately. The market specifies a size and distribution of the desired pulverulent materials as they are required, for example, for a particular 3D printer. In order to obtain the correct grain distributions, the pulverulent plastics (the starting powder) obtained from the comminuting step are screened at least once. Several screening processes may be carried out one after the other. In this case, the grain distribution is also dependent on the way in which comminuting and screening are carried out. The at least one screening process is adapted to the comminuting process and adjusted thereto. It is also adapted to the predefined grain distribution.

Depending on the selected comminuting process, the obtained pulverulent material has a characteristic shape of the individual particles or granules. The typical shape may deviate to a greater or lesser extent from the ultimately desired spherical shape. For example, the granules may be non-round, e.g. have appendages (tails), be relatively flat (platelets), be rod-shaped or the like. This affects the screening process and the screening result. It is possible to carry out a process of rounding the granules after the comminuting step and before the screening step. In this regard, reference is made to DE 10 2017 100 981 by the applicant, for example.

As the method was carried out in practice, it was found that problems caused by the comminuting step arise during the screening process, particularly if the starting powder was obtained from a thermoplastic elastomer, e.g. by grinding soft TPU, and exhibits a particular tack. The throughput of the device is frequently greatly reduced. The screening device tends to clog. An economically sound screening process frequently cannot be carried out.

SUMMARY

Against this background, the disclosure is based on improving the previous methods and the previous devices for comminuting a thermoplastic polymer and producing a powder therefrom in such a way that the screening process is made easier and improved.

This is achieved by providing a method for comminuting a thermoplastic polymer, in particular a thermoplastic elastomer, and for producing therefrom a pulverulent material with a predefined grain distribution, with the following method steps:

comminuting the thermoplastic polymer, which is provided as a starting material in lump form, into a starting powder in a comminuting device, screening this starting powder at least once until the predefined grain distribution has been attained, preferably filling the final powder obtained in this manner, wherein a release agent, which reduces the tack and capability for agglomeration formation of the starting powder, is fed into the comminuting device during the comminuting step.

A stable screening process could be achieved by means of this method. A constant powder distribution was achieved. The throughput increased considerably, e.g. tenfold. The bulk weight of the final powder also increased by at least 10, most frequently by at least 20%.

The comminuting method is carried out after one of the established comminuting methods known from the prior art. Important examples are mentioned above. Mechanical comminution generally takes place in a mill; for instance, whirlwind mills, pin mills, ball mills or the like are used in this case. If a spraying tower is used, comminution is achieved by melting or dissolving the thermoplastic polymer and atomization in the spraying tower.

The predefined grain distribution is generally specified by the market, most frequently by a specific customer. A typical example for a grain distribution is d90<125 µm, d50 between 60 and 80 µm, d10 between 20 and 30 µm. A polymer provided in lump form is understood to include granules, bars, blocks, commercially available delivery forms or other forms of the thermoplastic polymer starting material. The lumps of starting material have dimensions that are at least a thousand times greater than those of the starting powder, preferably dimensions in the centimeter range and greater.

Generally, only one polymer is in each case processed in accordance with the method; however, it is also possible to simultaneously process two or more polymers in the same device.

The fines content smaller than 10 µm is minimized in the final powder due to the improvement of the screening process. An additional dedusting step can thus be omitted. Health protection during the processing, and also in the subsequent further processing of the final powder, e.g. at the end customer, is improved. The free-flowing property of the final powder is improved considerably over final powder according to the prior art. Since there is less aggregate formation, which makes the screening process easier, less coarse content has to be returned to the comminuting step. The disclosure makes it possible to significantly reduce the proportion of coarse material that has to be returned to the comminuting process. This results in particles that actually already have the correct size to be comminuted again, because the proportion of fine content rises with each repeated comminuting step. A step of dedusting the starting powder or the final powder can be carried out additionally; according to the disclosure, it can be carried out with less effort.

The method is suitable for thermoplastic materials that tend to exhibit tack and agglomerate formation after the comminuting step. It is also suitable for thermoplastic polymers, such as PP, PA, PPS, ABS, PBT, PE, PS, PET, PMMA, PC, PEEK, PEKK, for instance. Particularly preferably, the method is suitable for TPU, ester-based and ether-based thermoplastic materials, e.g. TPEE.

The release agent is preferably provided in a very finely powdered form. It is supposed to coat the particles of the starting powder in a dust-like manner and thus prevent direct contact between two adjacent particles of the starting powder. The free-flowing property of the starting powder is thereby enhanced. The release agent may also be referred to as an additive, an anticaking agent or anti-agglomerate agent. The flowability of the starting powder is improved by the release agent. The flowability in the process plant, i.e. in its pipes, rotary feeders etc., is also improved.

Metal stearates and amide waxes are particularly preferred release agents. The melting temperature of the release agent should preferably be in the range between 50 and 160° C.

It is possible to heat up the starting powder after the comminuting step. Thus, the screening step can be carried out in a more convenient manner on a case-by-case basis.

A subsequent use of additives is frequently desired. According to the prior art, this necessitates an additional method step. According to the disclosure, such a step is no longer necessary because the additive is already added during the comminuting step, or an additional different additive provided in addition to the release agent can be added together with it.

The object is also achieved by providing a device serving for carrying out the method. The device for comminuting a thermoplastic polymer, in particular a thermoplastic elastomer, and for producing therefrom a pulverulent material with a predefined grain distribution, comprises
 a comminuting device for a thermoplastic polymer provided in lump form as a starting material, which preferably comprises a mill or a spraying tower, and which has an inlet for the thermoplastic polymer, an outlet for a starting powder and, optionally, further feed pipes, such as for a cryogas, for instance, and
 a screening device disposed downstream of the comminuting device and preferably connected therewith via pipelines in which the starting powder is conveyed, wherein the screening device has at least one screen designed for the predefined grain distribution. The comminuting device has a feed pipe for introducing a release agent into the comminuting device.

It is also possible to carry out the comminuting step at a separate time from the screening step. Oblong-mesh screens may be used as screens, e.g. a 300×110 µm oblong-mesh tumbling screen AVTM1600 by the company Allgaier.

All components located upstream of the screening device, i.e. also rotary feeders, conveying pumps etc., are regarded as being part of the comminuting device.

EXAMPLES

Example 1: TPU in lump form is introduced into the milling loop of a whirlwind mill and comminuted. 1% by wt. of an amide wax Baerolub L-AS by the company Baerlocher (based on the TPU introduced into the mill) is introduced together with the TPU. During the milling process, the mill effects an excellent distribution of the release agent in the starting powder. In the process, the lubricating effect of the release agent appears to be advantageous.

Example 2: The process is the same as in Example 1, however, 0.13% by wt. of an aluminum oxide (Alu C) is now added as a release agent. A bulk weight of 372 g/l is achieved for the grain distribution d90<125 µm, d50 between 60 and 80 µm, d10 between 20 and 30 µm.

Example 3: The process is the same as in Example 2, however, 2% by wt. of a Ca stearate (114-36 L3 by the company Valtris Specialty Chemicals) is now added as a release agent. A bulk weight of 462 g/l is achieved for the above-mentioned grain distribution. Compared with Example 2, it was possible to improve the throughput of the screening device by about 50%.

BRIEF DESCRIPTION OF THE DRAWINGS

Other advantages and features of the disclosure become apparent from the other claims as well as from the following description of two exemplary embodiments of the disclosure, which are to be understood not to be limiting and which will be explained below with reference to the drawing. In this drawing:

DETAILED DESCRIPTION OF THE DRAWINGS

Figure 1:
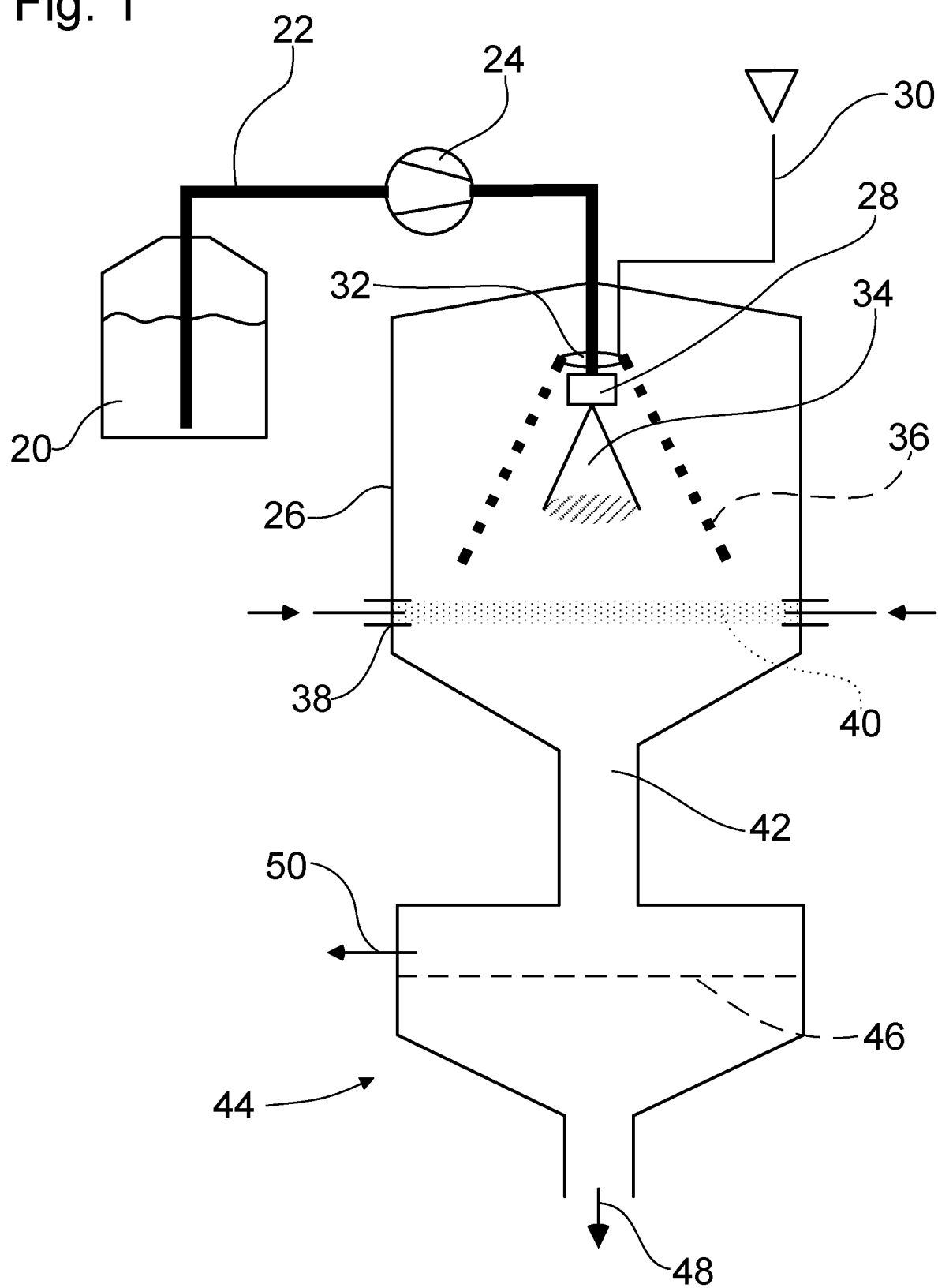
FIG. 1 shows a schematic illustration of a device for comminuting a thermoplastic material; comminution takes place by means of melting and atomization.

First, the device according to FIG. 1 will be described; the device according to FIG. 2 will only be described to the extent its individual components differ from the device according to FIG. 1.

TPU provided in the form of granules is melted in a melt container 20. From a melt container 20, it is fed, conveyed by a pump 24, to a container 26 forming a spraying tower via a conveyor pipe 22. A nozzle assembly 28 to which the molten material is fed is located at the top within this container 26. Liquid material exits its nozzle openings, e.g. in the form of thin threads that separate into droplets farther below. As the distance from the nozzle assembly 28 increases, the droplets become rounder, and free-falling particles are formed from them; they fall vertically downward.

A feed pipe 30 for cryogas, in particular liquid nitrogen, protrudes from above into the container 26, next to the conveyor pipe 22. The feed pipe 30 is connected to a feeding unit 32, which in this case is configured as a ring located above and outside the nozzle assembly 28.

The polymer material exits from the nozzle assembly 28 within a cone 34. The cryogas exits the feeding unit 32 in the shape of an envelope 36 of a cone; the cone 34 is located within the envelope 36 of the cone. The cone 34 is oriented in such a way that it does not hit the lateral walls of the container 26, if possible.

Lateral nozzles 38 or a similar introduction device are located in the lower region of the container 26. A release agent, a metal stearate, is introduced through them into the interior of the container 26 in such a way, see the arrows, that a layer 40 of the release agent is formed, if possible, in the lower region of the container 26. The droplets fall through this layer 40 and are thus coated by the release agent to a greater or lesser extent. Depending on the process control, a part of the release agent falls downward from the layer 40; this part falls on the region of the outlet that has oblique walls. The particles hit these oblique walls before they slowly get to the lowermost portion of the outlet 42. Thus, the particles can also be coated with the release agent when and while they rest on the oblique walls. They can also be coated with the release agent while they are located above the oblique walls and underneath the layer 40.

In the lower region of the container 26, the latter has a conically shaped outlet 42. There, the coated droplets have cooled off to such an extent that they are substantially no longer deformable; they form the starting powder. This now arrives in a screening device 44. In a modification, a rotary feeder as it is apparent from FIG. 2 may be interposed. It is part of the comminuting device. In a modification, it is possible to feed the release agent into this rotary feeder.

The screening device 44 is configured in accordance with the prior art. In order to simplify the illustration, it has only one screen 46. The predefined grain distribution is let through by the screen 46, see arrow 48; the rest is drained away, see arrow 50.

Figure 2:
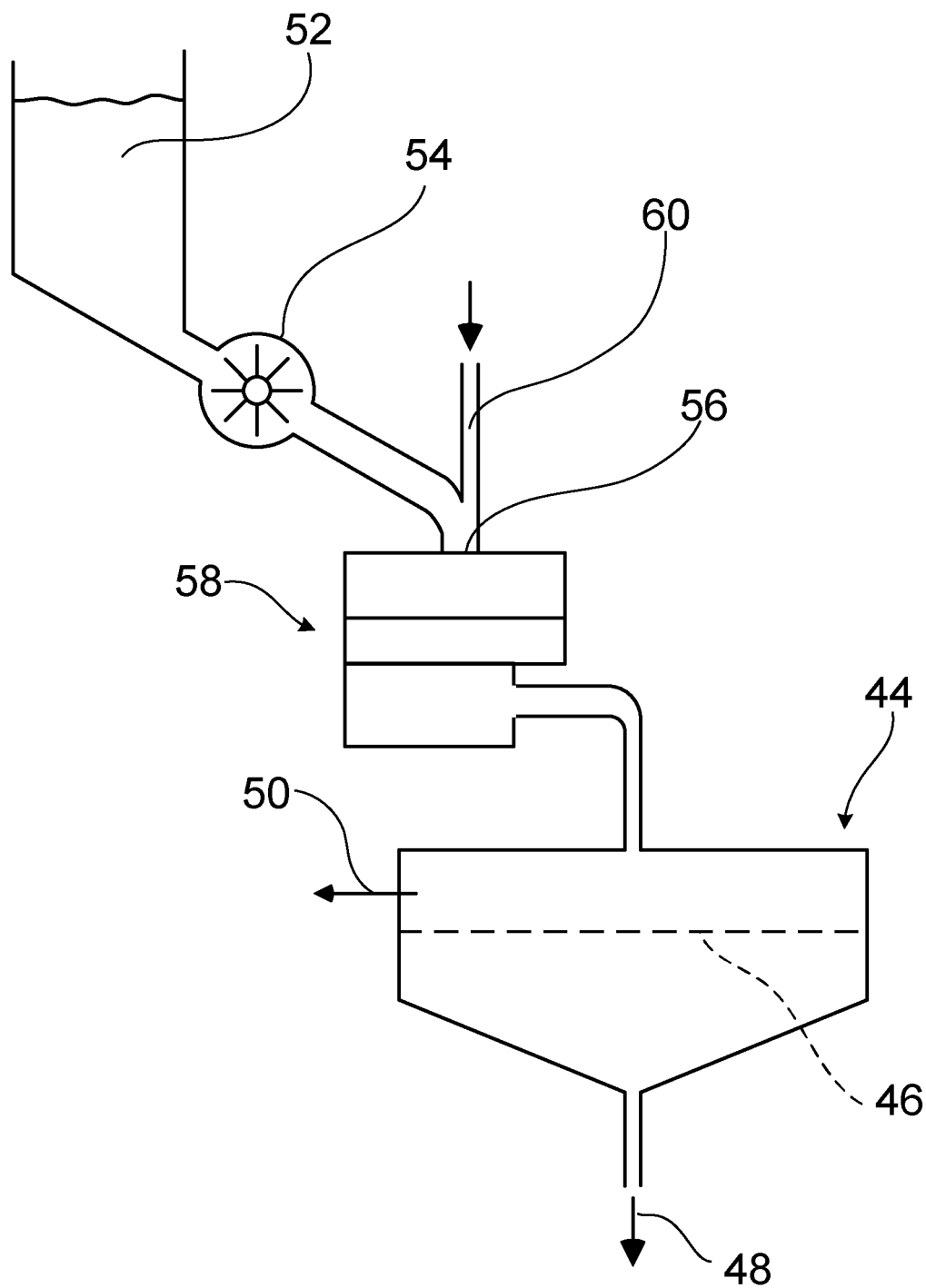
FIG. 2 shows a schematic illustration similar to FIG. 1, but in this case for a device in which comminution is carried out mechanically by means of a mill.

In the device according to FIG. 2, TPU in the form of granules is located in a feed container 52. The granules are fed via a rotary feeder 54 to an infeed portion 56 of a mill 58, which in this case is configured as a pin mill. A pipe 60 for release agents, in this case an amide wax, additionally leads into the feed pipe towards the mill 58. Thus, the granules and the release agent get into the infeed portion 56 of the mill 58 at the same time and are intimately mixed in the mill 58 during the milling process.

At the output side, conditions similar to those of FIG. 1 are provided. Also in this case, the outlet 42 of the mill 58 is directly connected to the screening device 44.

Terms like substantially, preferably and the like, and indications that may possibly be understood to be inexact are to be understood to mean that a deviation by plus/minus 5%, preferably plus/minus 2%, and in particular plus/minus one percent from the normal value is possible. The applicant reserves the right to combine any features and even sub-features from the claims and/or any features and even partial features from a sentence of the description with other features, sub-features or partial features in any form, even outside of the features of independent claims.

The applicant further reserves the right to delete any features and also partial features.

In the Figures, parts that are equivalent with respect to their function are always provided with the same reference numerals, so that they are also only described once, as a rule.

The invention claimed is:

1. A method for comminuting a thermoplastic polymer and for producing therefrom a pulverulent materials with a predefined grain distribution, the method including the following steps:
   predefining a desired grain distribution of the pulverulent material,
      comminuting the thermoplastic polymer, which is provided in lump form, into a starting powder in a comminuting device, wherein the starting powder comprises granules, and
      screening the starting powder at least once until the pulverulent material with the predefined grain distribution has been attained,
   wherein a release agent, is fed into the comminuting device during the comminuting step, wherein the release agent is provided in finely powdered form and wherein the release agent coats the granules of the starting powder in dust-like manner to reduce the tack and capability of the starting powder for agglomeration formation,
   wherein a) the step of comminuting is carried out in a mill comprised by the comminuting device and thereby a cooling agent with a temperature of <−50° C. is fed into the comminuting device, or
   b) the step of comminuting uses a spraying tower, in which the thermoplastic polymer is comminuted by melting or dissolving and then atomizing or spraying via at least one spraying nozzle, wherein a cooling agent with a temperature of <−50° C. is fed into the comminuting device.

2. The method according to claim 1, wherein the release agent is selected from at least one from the following group: surfactants, waxes, and metallic soaps.

3. The method according to claim 1, wherein the release agent is hydrophobic.

4. The method according to claim 1, wherein the release agent has a melting point temperature differing from the temperature of the melting point of the polymer by 30° C. at most.

5. The method according to claim 1, wherein the release agent is supplied prior to the production of the starting powder being finished.

6. The method according to claim 1, wherein at least one mechanically moved screen, is used in the screening step.

7. The method according to claim 1, wherein the release agent is supplied with a percentage by weight of 5% at most, based on the weight of the thermoplastic polymer.

8. The method according to claim 1, wherein the release agent is supplied with a percentage by weight of at least 0.1 based on the weight of the thermoplastic polymer.

9. The method according to claim 1, characterized in that the thermoplastic polymer has a Shore A hardness of less than 90 at normal temperature.

10. A device for comminuting a thermoplastic polymer according to the method of claim 1 and for producing therefrom a pulverulent material with a predefined grain distribution, the device comprising:
- a comminuting device for thermoplastic polymers provided in lump form, which comprises a mill or a spraying tower, and which has an inlet for the thermoplastic polymer, an outlet for starting powder, and a feed pipe for a cooling agent with a temperature of <−50° C.; and
- a screening device disposed downstream of the comminuting device and connected therewith via pipelines in which the starting powder is conveyed, wherein the screening device has at least one screen designed for the predefined grain distribution, wherein the comminuting device has a means for introducing a release agent into the comminuting device.

11. The device according to claim 10, wherein the means is a pipe or a nozzle for the release agent.

12. The device of claim 10, wherein the spraying tower has at least one spraying nozzle and an outlet, and that the means for introducing a release agent is at least one nozzle disposed in the spraying tower between the spraying nozzle and the outlet.

13. The device according to claim 12, wherein droplets exiting the spraying nozzle move within the spraying tower towards the outlet, and that the nozzle is configured for causing in the spraying tower a mist of release agent through which the droplets move.

14. The device according to claim 10, wherein when the comminuting device includes a mill, the means for introducing the release agent is a pipe formed together with the infeed portion for the thermoplastic polymer or for the cooling agent.

* * * * *